A. E. VAN HORN.
WAGON-JACK.
No. 174,748. Patented March 14, 1876.
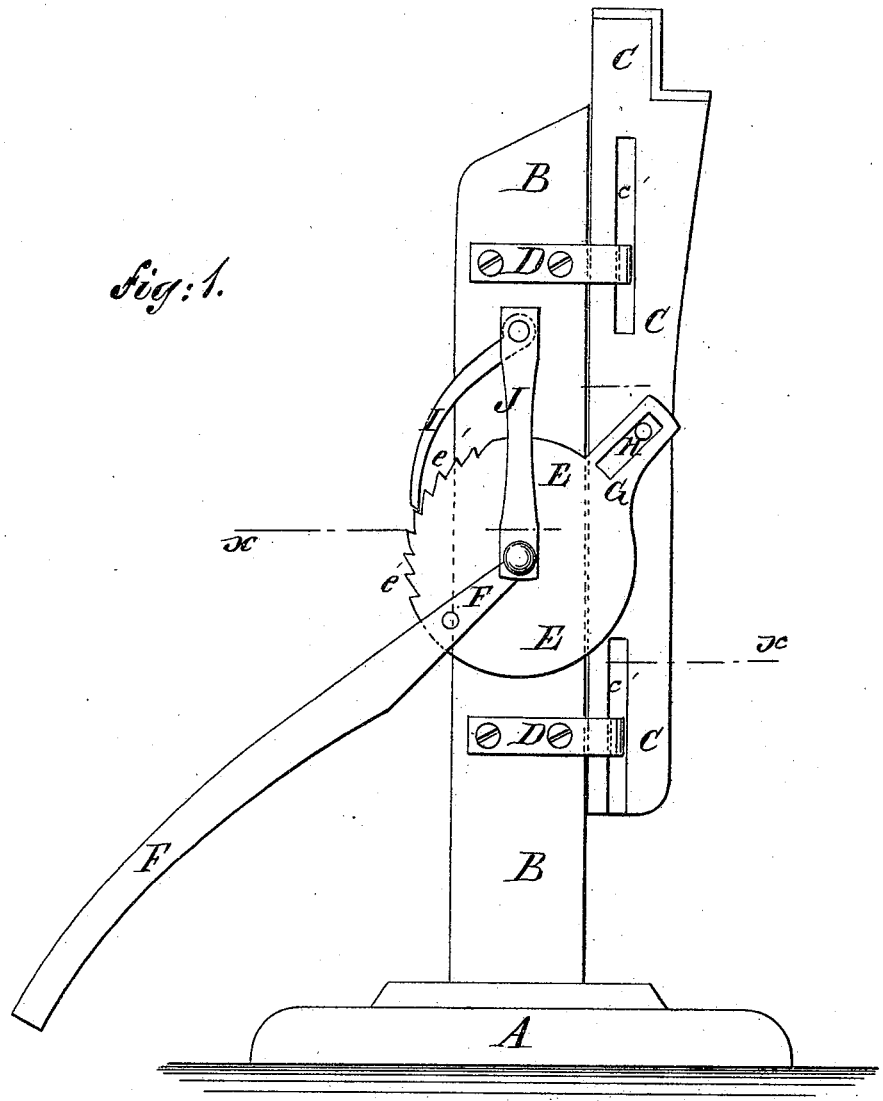
Fig: 1.
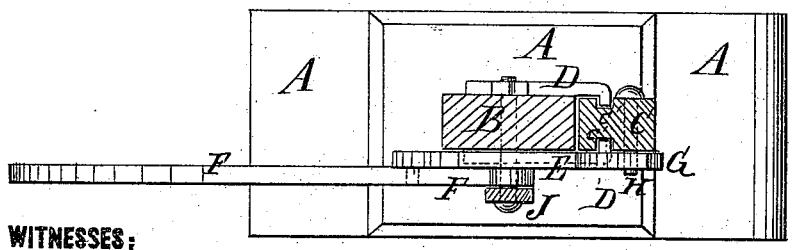
Fig: 2.
WITNESSES:
Chas. Nicla
Alex F. Roberts
INVENTOR:
A. E. Van Horn
BY
ATTORNEYS.

UNITED STATES PATENT OFFICE.

ALBERT E. VAN HORN, OF SEBEWAING, MICHIGAN.

IMPROVEMENT IN WAGON-JACKS.

Specification forming part of Letters Patent No. 174,748, dated March 14, 1876; application filed November 13, 1875.

*To all whom it may concern:*

Be it known that I, ALBERT E. VAN HORN, of Sebewaing, Huron county, Michigan, have invented a new and Improved Wagon-Jack, of which the following is a specification:

Figure 1 is a side view of my improved wagon-jack, and Fig. 2 is a cross-section of the same, taken through the line $x\,x$, Fig. 1.

Similar letters of reference indicate corresponding parts.

The object of this invention is to furnish an improved wagon or lifting jack, simple in construction, neat in appearance, convenient in use, light, strong, durable, and not liable to get out of order.

The invention consists in the combination of the toothed wheel, the lever, the slotted arm, the bolt, and the pawl, with the standard and the sliding bar connected together by straps and grooves, as hereinafter fully described.

A is the foot or base, which is made of sufficient length and breadth to give the jack a stable support. To the middle part of the base A is attached the lower end of a standard, B, against the forward edge of which is placed a sliding bar, C. Upon the upper end of the sliding bar C is formed a step to receive the axle or other weight to be lifted. In the opposite sides of the upper and lower parts of the sliding bar C are formed longitudinal grooves $c'$. To the opposite sides of the standard B are secured straps D, two to each side, the forward parts of which project, and their ends are bent inward at right angles, to enter the grooves $c'$ of the sliding bar C, and thus keep it in place while being operated. To the side of the middle part of the standard B is pivoted a wheel, E, to one side of which is securely attached a lever, F, by which it is operated. Upon the other side of the wheel E is formed, or to it is attached, an arm, G, which is slotted longitudinally to receive a bolt, H, attached to the sliding bar C. The wheel E, the lever F, and the arm G thus form a long lever for raising the sliding bar C, and with it the weight. Upon the rear part of the upper edge of the wheel E are formed ratchet-teeth $e'$, with which the pawl I engages to hold the sliding bar C and the weight that may be resting upon it securely in any position into which it may be raised. J is a keeper attached to the pivots of the wheel E and pawl I, to support the outer end of said pivots, and to keep the said wheel and pawl in line with each other and with the standard B.

Having thus described my invention, I claim as new and desire to secure by Letters Patent—

The combination of the toothed wheel E, the lever F, the slotted arm G, the bolt H, and the pawl I with the standard B and the sliding bar C, connected together by the straps D and grooves $c'$, substantially as herein shown and described.

ALBERT EUGENE VAN HORN.

Witnesses:
JACOB SPRIESS,
G. COVEY, Jr.